US011904363B2

(12) United States Patent
Bover Capdevila et al.

(10) Patent No.: US 11,904,363 B2
(45) Date of Patent: Feb. 20, 2024

(54) SYSTEM AND METHOD FOR AUTOMATIC SORTING OF TEXTILE ITEMS

(71) Applicant: GIRBAU, SA, Vic (ES)

(72) Inventors: Eudald Bover Capdevila, Vic (ES); Jose Antonio Perez Gracia, Barcelona (ES); Jaume Simonet Comas, Sant Quirze del Valles (ES)

( * ) Notice: Subject to any disclaimer, the term of this patent is extended or adjusted under 35 U.S.C. 154(b) by 0 days.

(21) Appl. No.: 18/020,003

(22) PCT Filed: May 13, 2021

(86) PCT No.: PCT/EP2021/062783
§ 371 (c)(1),
(2) Date: Feb. 6, 2023

(87) PCT Pub. No.: WO2022/028746
PCT Pub. Date: Feb. 10, 2022

(65) Prior Publication Data
US 2023/0286018 A1 Sep. 14, 2023

(30) Foreign Application Priority Data
Aug. 7, 2020 (EP) .................................... 20382733

(51) Int. Cl.
*D06F 93/00* (2006.01)
*B07C 5/36* (2006.01)
*B07C 5/02* (2006.01)

(52) U.S. Cl.
CPC .................. *B07C 5/36* (2013.01); *B07C 5/02* (2013.01); *D06F 93/00* (2013.01)

(58) Field of Classification Search
CPC ... B07C 5/02; B07C 5/36; D06F 93/00; D06F 95/00
(Continued)

(56) References Cited

U.S. PATENT DOCUMENTS 4,693,460 A * 9/1987 Adamson ........... A41H 43/0214 112/272
5,419,439 A * 5/1995 Branch .................. B65G 47/50 209/3.3
(Continued)

FOREIGN PATENT DOCUMENTS

CN 206883664 U * 1/2018
CN 112176688 B * 10/2023 ............ D06F 57/00
(Continued)

*Primary Examiner* — Terrell H Matthews
(74) *Attorney, Agent, or Firm* — Eugenio J. Torres-Oyola; Victor M. Rodriguez-Reyes; Rafael Rodriguez-Muriel

(57) ABSTRACT

The present invention discloses a system for textile items sorting comprising a reception station; a textile items recognition station; a pick-up and transferring device including grippers configured to grab individual pieces of textile items, and moving members configured to convey the gripper from the reception station to the textile items recognition station; and a sorting and separating station. The present invention also discloses a method for automatic sorting of textile items comprising the steps of: accumulating textile items within a reception station; picking up textile items from the reception station and transferring them to a textile items recognition station; identifying the textile items in the textile items recognition station; and conveying identified textile items to a sorting and separating station for textile items including several deposits for receiving different kinds of sorted textile items.

19 Claims, 6 Drawing Sheets

(58) Field of Classification Search
USPC .......................................................... 209/552
See application file for complete search history.

(56) References Cited

U.S. PATENT DOCUMENTS

| | | | | |
|---|---|---|---|---|
| 6,085,914 | A * | 7/2000 | Tobaccowala .......... | B07C 7/005 209/702 |
| 7,370,765 | B1 * | 5/2008 | Ellenberger ............ | D06F 93/00 209/912 |
| 2013/0134075 | A1 * | 5/2013 | Berdelle-Hilge ......... | B07C 3/02 209/552 |

FOREIGN PATENT DOCUMENTS

| | | | | |
|---|---|---|---|---|
| DE | 102019135659 | A1 * | 6/2021 | ............. B65G 47/91 |
| EP | 244544 | A * | 11/1987 | ........... G06F 13/124 |
| EP | 2915917 | A2 * | 9/2015 | ............. D06F 93/00 |
| EP | 3029195 | A1 * | 6/2016 | ............. B65G 47/90 |

* cited by examiner

SYSTEM AND METHOD FOR AUTOMATIC SORTING OF TEXTILE ITEMS

TECHNICAL FIELD

The present disclosure relates to the field of automatic sorting of textile items. The present disclosure is particularly advantageous for sorting soiled clothes or laundry items, or for use in textile recycling, among others.

The invention provides a system and a method for automatic sorting of textile items.

BACKGROUND ART

EP2915917B1 discloses a method for sorting laundry, in particular dirty laundry, wherein the laundry is placed on a conveyor and the laundry is sorted at a plurality of sorting stations arranged successively along the conveyor by persons in accordance with its properties and/or size, wherein the laundry is sorted by different sorting methods at some sorting stations in that the laundry is handled differently in the different sorting methods at some sorting stations. Large items of laundry are sorted by a partially mechanized sorting method at a first sorting station, small items of laundry are sorted by a manual sorting method at one further sorting station, and remaining, leftover items of laundry are sorted at a last sorting station.

EP2444544B1 relates to a method of separating items of laundry, wherein items (10) of laundry are extracted from a pile (18) of laundry by a gripping arrangement (20), the at least one item (10) of laundry hanging down from the gripping arrangement (20) is transferred to a belt conveyor (23), which follows the gripping arrangement (20) as seen in the conveying direction (24), and a rear end of an item (10) of laundry, as seen in the conveying direction (24) of the belt conveyor (23), is detected and fixed at that end (30) of the belt conveyor (23) which is located opposite the gripping arrangement (20). In the case of a plurality of items (10) of laundry on the belt conveyor (23), only the final item of laundry, as seen in the conveying direction, is fixed at the rear end and the at least one further, unfixed item (10) of laundry, of which a main part hangs down in front of the rear end (30) of the belt conveyor (23), is ejected from the belt conveyor (23) wherein this at least one item of laundry slides downwards from the belt conveyor (23) under its own weight and during the transport of the least one item (10) of laundry on the belt conveyor (23), a sensor means of the belt conveyor (23) detects the rear corner of that item (10) of laundry which is the last to pass the sensor means.

EP3029195A1 relates to a method for feeding items of laundry to a laundry treatment device, wherein an item of laundry is gripped, said item of laundry is spread out at two adjacent corners of a front edge and deposited with said front edge on a feed conveyor which transports the item of laundry to the mangle or to some other laundry-treatment device, and to a method for feeding items of laundry to a laundry treatment device, wherein an item of laundry is gripped and said item of laundry is spread out at two adjacent corners of a front edge and transported with this front edge as the leading edge to the laundry treatment device, wherein the surface profile of the item of laundry is determined by at least one imaging process Furthermore, EP 3029195 A1 also relates to an apparatus for feeding items of laundry to a laundry treatment device with a transport system having moveable clamps for holding a respective corner of an item of laundry, to an apparatus for feeding items of laundry to a laundry treatment device in which the transport system is assigned at least one pair of rollers for the passage of at least one part of an item of laundry and wherein the two rollers of the pair of rollers can rotate about parallel, upright axes of rotation, and to an apparatus for feeding items of laundry to a laundry treatment device in which the transport system is assigned at least one pair of rollers for the passage of at least one part of an item of laundry, wherein the two rollers of the pair of rollers can rotate about parallel axes of rotation that can be brought at least into a nearly upright position.

CN109465840A relates to a sucker-gripper composite grabbing device and belongs to the technical field of sorting robots. Said sucker-gripper composite grabbing comprises a base, a sucker and a gripper composed of a plurality of finger sections, wherein the sucker located at the centre of the base and the plurality of finger sections are circumferentially and uniformly distributed around the sucker.

CN206883664U discloses a manipulator comprising a suction disc and a plurality of claws arranged circularly around the suction disc.

There remains in the art a need for alternative systems for automatically sorting textile items.

BRIEF DESCRIPTION OF THE INVENTION

In order to address one or more of the foregoing problems, one aspect of the present invention provides a system for automatic sorting of textile items that comprises as known in the art a reception station for accumulated textile items; a textile items recognition station including a textile items identifying and recognizing device; a pick-up and transferring device including grippers configured to grab individual pieces of textile items accumulated on the reception station, and transferring them from the reception station to the textile items recognition station and a sorting and separating station for textile items having been recognized by the textile items identifying and recognizing device.

According to this invention the reception station includes a deposit having a first conveyor belt arranged at a bottom area of the deposit; the textile items recognition station includes a second and a third conveyor belts at different heights; the pick-up and transferring device comprise at least a pair of inclined tracks extending from a position above the first conveyor belt to a position above the second conveyor belt, each track including an independently actuated gripper associated to a moving member displaceable along the track; and the third conveyor belt includes a feeding end connected to the sorting and separating station and a returning end extending over the first conveyor for returning textile items to the reception station.

According to the present invention, the pick-up and transferring device may comprise suction means fluidly connected to a suction pump, the suction means comprising a casing at least partially enclosing a gripper, the casing having an open end for the passage of the gripper therethrough. Preferably, the suction pump is at least one of a positive displacement pump, a momentum transfer pump, a regenerative pump, an entrapment pump and/or a venturi pump.

According to the present invention, the casing of the suction means may be tapered towards its open end.

According to the present invention, the casing of the suction means may be fluidly connected to the suction pump by a hose.

According to the present invention, the casing of the suction means may comprise a flexible and expansible tubular section around its open end.

As per an arrangement of the textile items recognition station the cited second conveyor belt is at a superior height relative to the third conveyor belt. According to the present invention the second and third conveyor belts may be partially overlapped.

According to the present invention, the referred inclined tracks are parallel to each other and their respective grippers are synchronized so that when one gripper grabs the pieces of textile items on the reception station, the other gripper is in a stage of transference of textile items to the textile items recognition station.

According to the present invention, each inclined track may comprise at least a first and a second inclined track portions that intersect each other defining a transfer region, a first inclined track portion extending from the position above the first conveyor belt to the transfer region and a second track portion extending from the transfer region to the position above the second conveyor belt. Each of the inclined track portions includes an independently actuated gripper associated to a moving member displaceable along the inclined track portion. In this way a transfer of the items from one track portion to another takes place and if a gripper of the first inclined track portion has picked up more than one item during the transfer only one item is transferred, and the surplus is dropped.

According to the present invention, the first and second inclined track portions may intersect each other defining an acute angle, a right angle or an obtuse angle.

According to the present invention, a gripper of the first inclined track portion may be configured to transfer the pieces of textile items from the reception station to the transfer region wherein a respective gripper of the second inclined track portion may be configured to grab the textile item and transfer it to the textile items recognition station.

According to the present invention, the system for automatic textile items sorting may further comprise a control device configured to activate or deactivate the suction means of the gripper.

According to the present invention, the control device may be configured to activate the suction means of the gripper of the second inclined track portion when said gripper reaches the transfer region.

According to the present invention, the control device may be configured to deactivate the suction means after the corresponding gripper has transferred the textile item.

According to the present invention, the control device may be configured to deactivate the suction means of the corresponding gripper of the first inclined track portion when it leaves the position above the first conveyor belt and to deactivate the suction means of the corresponding gripper of the second inclined track portion when it leaves the transfer region.

In order to facilitate the grabbing of one single item of textile items the moving member is connected to the gripper by means of a portion with elasticity in a direction of movement of the gripper towards the accumulated textile items, to cushion the impact of the gripper on textile items.

According to a preferred embodiment of the present invention, the system for automatic sorting of textile items may further comprise a feeding station that is connected to the reception station comprising a fourth conveyor belt with a feeding section arranged at a superior height relative to the first conveyor belt. In an embodiment the fourth conveyor belt is arranged substantially perpendicular to the first conveyor belt.

The system for textile items sorting according to the present invention may further disclose the textile items identifying and recognizing device associated to the third conveyor belt.

As for the textile items identifying and recognizing device it can be implemented by means of a system based on radiofrequency identification (RFID), X ray, and/or cameras. The one or more cameras can be a regular RGB camera and/or a Near Infrared (NIR) camera, among others.

In yet another aspect of the present invention, the system automatic sorting of textile items may further comprise a separating station including several successive stepped conveyor belts each of them with a first end over a deposit for receiving a given kind of textile items and a second end over a successive conveyor belt.

Another aspect of the present invention relates to a method for sorting textile items comprising as known in the prior art the following steps: accumulating textile items within a reception station; picking up textile items from the reception station and transferring them to a textile items recognition station; identifying the textile items in the textile items recognition station; and conveying identified textile items to a sorting and separating station for textile items including several deposits for receiving different kinds of sorted textile items.

According to this invention the step of identification of the textile items in the textile items recognition station comprises: receiving the transferred textile items on a second conveyor belt arranged at a first height; transferring the received textile items from this second conveyor belt to a third conveyor belt located at a lower height with respect to the second conveyor belt; identifying the textile items when arranged on said third conveyor; and actuating the third conveyor into a feed direction towards the sorting and separating station or in a returning direction towards the reception station, depending on the result of the identification. Alternatively, according to this invention, the step of identifying the textile items can also be performed when the textile items are arranged on the second conveyor belt.

According to this invention, the step of identifying the textile items can be performed with the textile items being in motion, i.e., with the textile item moving on the corresponding conveyor belt, e.g., the second or third conveyor belt. Alternatively, according to this invention, the step of identifying the textile items can also be performed with the textile items being still, i.e., with the textile item being on the corresponding conveyor belt, e.g., the second or third conveyor belt, which is still or stopped.

In the present invention, the method for sorting textile items further comprises a step of accumulation of textile items in the reception station comprising: receiving the textile items on a first conveyor belt in the reception station; and conveying by means of the first conveyor belt the textile items to a certain pick up location of the reception station from which the pair of inclined tracks start.

In the present invention, the step of picking up textile items from the reception station and transferring them to a textile items recognition station may comprise: grabbing a textile item from the reception station with a gripper arranged in at least an inclined track extending from a position above the first conveyor belt to a position above the second conveyor belt; and transfer the textile item to the second conveyor belt. More specifically, in the present invention the step of picking up textile items from the reception station and transferring them to a textile items recognition station may comprise: grabbing a textile item from the reception station with a gripper arranged in a first inclined track portion extending from a position above the first conveyor belt to a second inclined track intersecting said first inclined track and extending to a position above the second conveyor belt; transfer the textile item from the reception station to the intersection between the first and the second inclined track portions; grabbing the textile item with a gripper arranged in the second inclined track portion; and transfer the textile item from the intersection between the first and second inclined track portions to the second conveyor belt.

In the present invention, the step of grabbing a textile item from the reception station with a gripper comprises: sucking a textile item from the reception station with suctions means; and grabbing the textile item with the gripper. In the present invention, the step of grabbing a textile item from the reception station with a gripper may further comprise: stopping the suction means once the gripper has grabbed the textile item.

It will be understood that references to geometric position, such as parallel, perpendicular, tangent, etc. allow deviations up to ±5° from the theoretical position defined by this nomenclature.

BRIEF DESCRIPTION

The foregoing and other advantages and features will be more fully understood from the following detailed description of an embodiment with reference to the accompanying drawings, to be taken in an illustrative and non-limitative manner, in which.

DETAILED DESCRIPTION OF THE INVENTION

Figure 1:
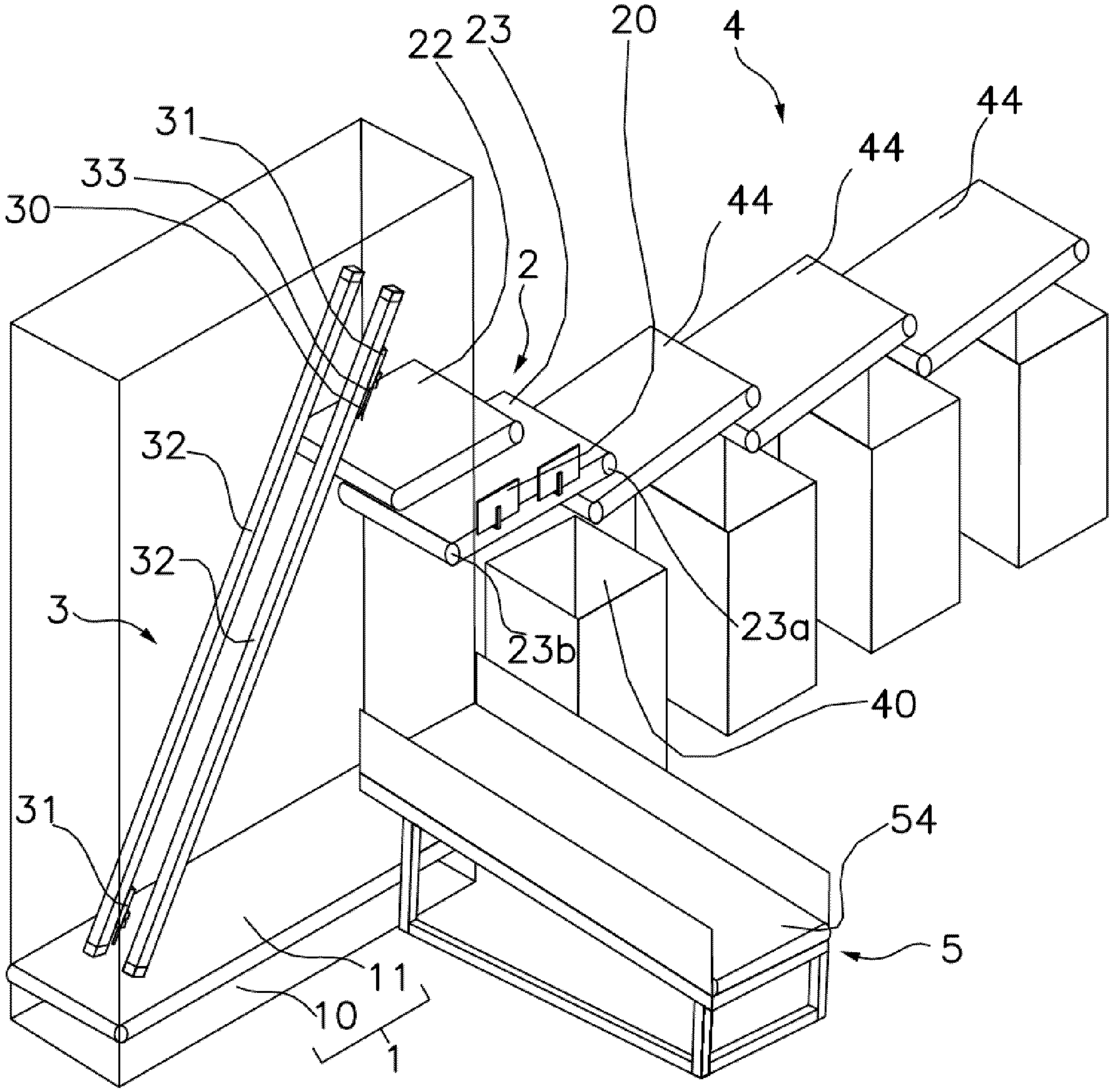
FIG. 1 shows a perspective view of a first exemplary embodiment of a system for automatic textile items sorting according to the present invention.

FIG. 1 shows a perspective view of the system for textile items sorting according to a first exemplary embodiment of the present invention, comprising a reception station 1 for textile items, a textile items recognition station 2, a pick-up and transferring device 3, a sorting and separating station 4 for textile items and a feeding station 5. In this first exemplary embodiment, the system is configured to sort soiled clothes. However, it can also be configured to sort laundry items or to be used in textile recycling, among other possible uses.

The reception station 1 includes a deposit 10 having a first conveyor belt 11 arranged at the bottom area of the deposit. The first conveyor belt 11 moves the textile items to a certain pickup location where they are accumulated and from where a pick-up and transferring device 3 picks or grabs them.

The pick-up and transferring device 3 includes grippers 30 configured to grab individual pieces of textile items accumulated on the reception station 1 and moving members 31, e.g., a linear slide, configured to convey the grippers 30 from the reception station to a textile items recognition station 2.

The textile items recognition station 2 includes a second and a third conveyor belts 22, 23 at different heights.

The moving members 31 of the present invention are movable along two or more inclined tracks 32 extending from a position above the first conveyor belt 11 to a position above the second conveyor belt 22, each track 32 including an independently actuated gripper 30 associated to a moving member 31.

The embodiment of FIG. 1 shows two inclined tracks 32 parallel to each other. Preferably, the movement of the grippers 30 along the tracks 32 are synchronized so that when one gripper grabs the pieces of textile items on the reception station 1, the other gripper 30 is in a stage of transference of the pieces of textile items to the textile items recognition station 2. In other words, when one gripper 30 is at the bottom part of the track 32, the other gripper 30 is about the upper part of his respective track 32. The synchronization of the movement in the picking-up and transferring device 3 allows for a more efficient sorting and separation of textile items. In other embodiments the grippers 30 may be configured differently.

In accordance with the provisions of this invention the third conveyor belt 23 includes a feeding end **23*a* connected to the sorting and separating station 4 and a returning end 23*b* extending over the first conveyor 11 for returning textile items to the reception station 1**.

When the individually pieces of textile items are transferred from the reception station 1 to the textile items recognition station 2, the second conveyor belt 22 transfers the textile items to the third conveyor belt 23. The recognition station 2 comprises a textile items identifying and recognizing device 20 that determines the kind of individual textile items and in addition checks whether the picked and transferred textile items is an individual pieces or, on the contrary, more than one piece has been picked and transferred. If only one piece has been picked, the third conveyor belt 23 is actuated into a feed direction so that the textile item once identified moves from the textile items recognition station 2 to the sorting and separating station 4. On the contrary, if more than one piece of textile items has been picked and transferred, the third conveyor belt 23 is actuated in an opposite, returning direction, so that the textile items move from the recognition station 2 and are returned to the reception station 1. The risk of picking more than one piece of textile item up can be reduced with suction means 36 comprising a casing 361 having an open portion surrounded with a flexible and expansible tubular section 362, as described hereinafter.

FIG. 1 also shows that according to the proposed first exemplary embodiment the second conveyor belt 22 is arranged at a superior height relative to the third conveyor belt 23. In that way, the textile items transferred to the second conveyor belt 22 from the first conveyor belt 11 in the reception station 1 fall over the third conveyor belt 23. In FIG. 1, the second and the third conveyor belt 22, 23 are partially overlapped.

The third conveyor belt 23 has associated an identifying and recognizing device 20 of the known type, for example including cameras that detect whether one or more pieces of textile items have been picked and transferred, as explained before. The identifying and recognizing device 20 can identify textile items being in motion or being still.

The identifying and recognizing device 20 is configured to identify the kind of textile items arriving to the textile items recognition station 2, i.e., whether the textile items are trousers, T-shirts, sheets, towels, etc. Preferably, the textile items identifying and recognizing device 20 includes a recognizing and identification system based on radiofrequency identification (RFID) to operate with tags on the textile items. Alternatively, the system could include X ray identification system and/or cameras. The one or more cameras may be a visible image camera, i.e., a regular or RGB camera, a Near Infrared Range (NIR) camera, etc. The identified individual piece of textile items is moved to the sorting and separation station 4 by means of the third conveyor belt 23.

The identifying and recognizing device 20 can also be associated with the second conveyor belt 22.

The sorting and separation station 4 shown in FIG. 1 includes three successive stepped conveyor belts 44 with a first end of each individual conveyor belt over a deposit 40 and a second end over a subsequent conveyor belt except for the third one, that has the second end over a fourth deposit. Each deposit 40 accumulates one kind of textile items that has been previously identified and recognized by the identifying and recognizing device 20.

Moreover, FIG. 1 also shows a feeding station 5 where textile items are first deposited, for instance by an operator. The feeding station 5 in the embodiment illustrated has a fourth conveyor belt 54 that transfers the textile items onto the reception station 1. The feeding station 5 is arranged substantially perpendicular to the reception station 1 in FIG. 1 for space optimization, but other alternatives might be envisaged.

Figure 2:
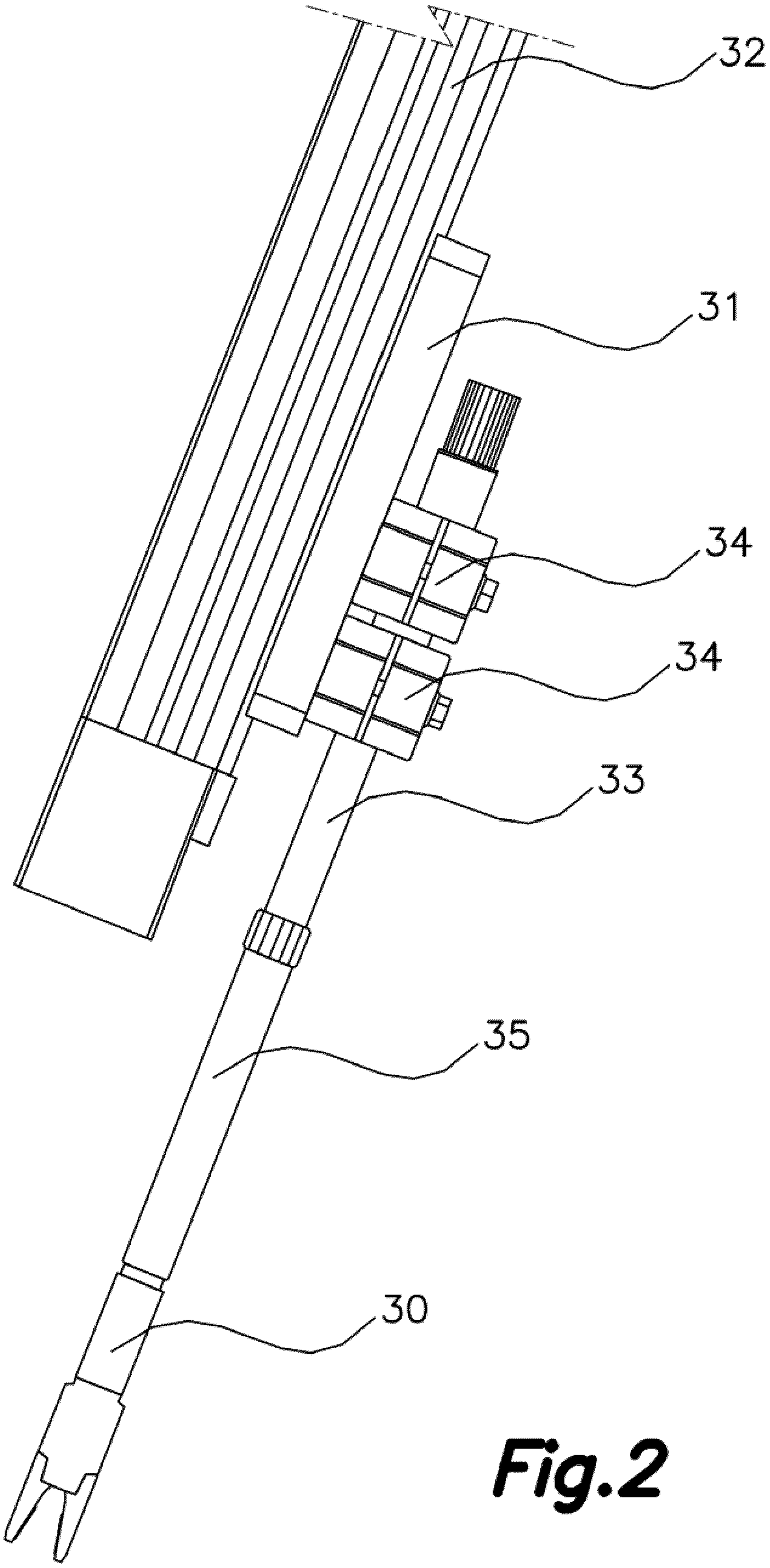
FIG. 2 shows a partial detailed view of a gripper of the pick-up and transferring device of the first exemplary embodiment of a system for automatic textile items sorting according to the present invention.

FIG. 2 shows a partial detailed view of the pick-up and transferring device 3 of the first exemplary embodiment of the system for automatic textile items sorting of the present invention. The device 3 comprises a track 32 and a moving part 31 connected to a holder 34. The moving part 31 moves along the track 32 and acts as a support for the holder 34, provided with the gripper 30. The holder 34 is connected to the gripper 30 by means of a portion 33 connected by its lower part with respect to the track 32 to an extender 35 that is further connected to a gripper 30. To cushion the impact of the gripper 30 on textile items, the portion 33 is elastic with regard to a direction of movement of the gripper 30 towards the accumulated textile items.

The elastic portion 33 is configured to perform the same amount of pressure onto the textile items, independently of the amount of accumulated textile items, allowing the gripper 30 to grab only one individual piece of textile items.

The extender 35 separates the gripper 30 from the track 32 allowing enough space to grab the textile items.

The gripper 30 is configured to grab an individual piece of textile items and not to tear them.

Figure 3:
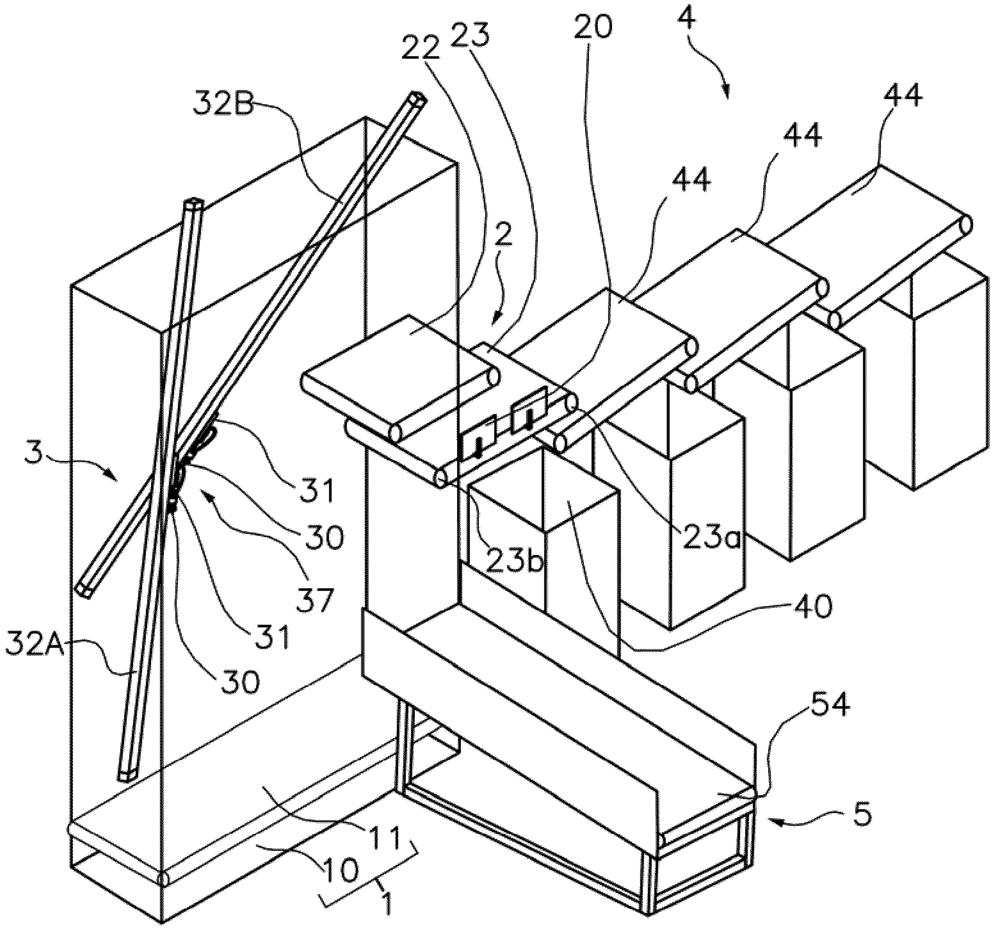
FIG. 3 shows a perspective view of a second exemplary embodiment of a system for automatic textile items sorting according to the present invention.

FIG. 3 shows a perspective view of the system for automatic textile items sorting according to a second exemplary embodiment of the present invention. The reception station 1, the textile items recognition station 2 and the sorting and separating station 4 of the second exemplary embodiment shown in FIG. 3 are similar to the corresponding ones of the first exemplary embodiment shown in FIG. 1 and described hereinabove. However, in other embodiments at least one of the reception station 1, the textile items recognition station 2 and/or the separating station 4 may differ from what is shown in FIGS. 1 and 3.

In this second exemplary embodiment, the system is configured to sort soiled clothes. However, it can also be configured to sort laundry items or to be used in textile recycling, among other possibilities.

The pick-up and transferring device 3 of the second exemplary embodiment of the present invention comprises a first inclined track portion 32A and a second inclined track portion 32B that intersect each other defining a transfer region 37. In the present case, the first inclined track portion 32A extends from a position above the first conveyor belt 11 to the transfer region 37 and the second inclined track portion 32B extends from the transfer region 37 to a position above the second conveyor belt 22. In the embodiment shown, the intersection between the first and second inclined track portions 32A, 32B defines an obtuse angle. However, in other embodiments said intersection may define an acute or a right angle.

Even if the second exemplary embodiment only comprises a first and a second inclined track portion 32A, 32B, other embodiments of the present invention may comprise two or more first inclined track portions 32A having corresponding two or more second inclined track portions 32B being parallel to each other.

Figure 4:
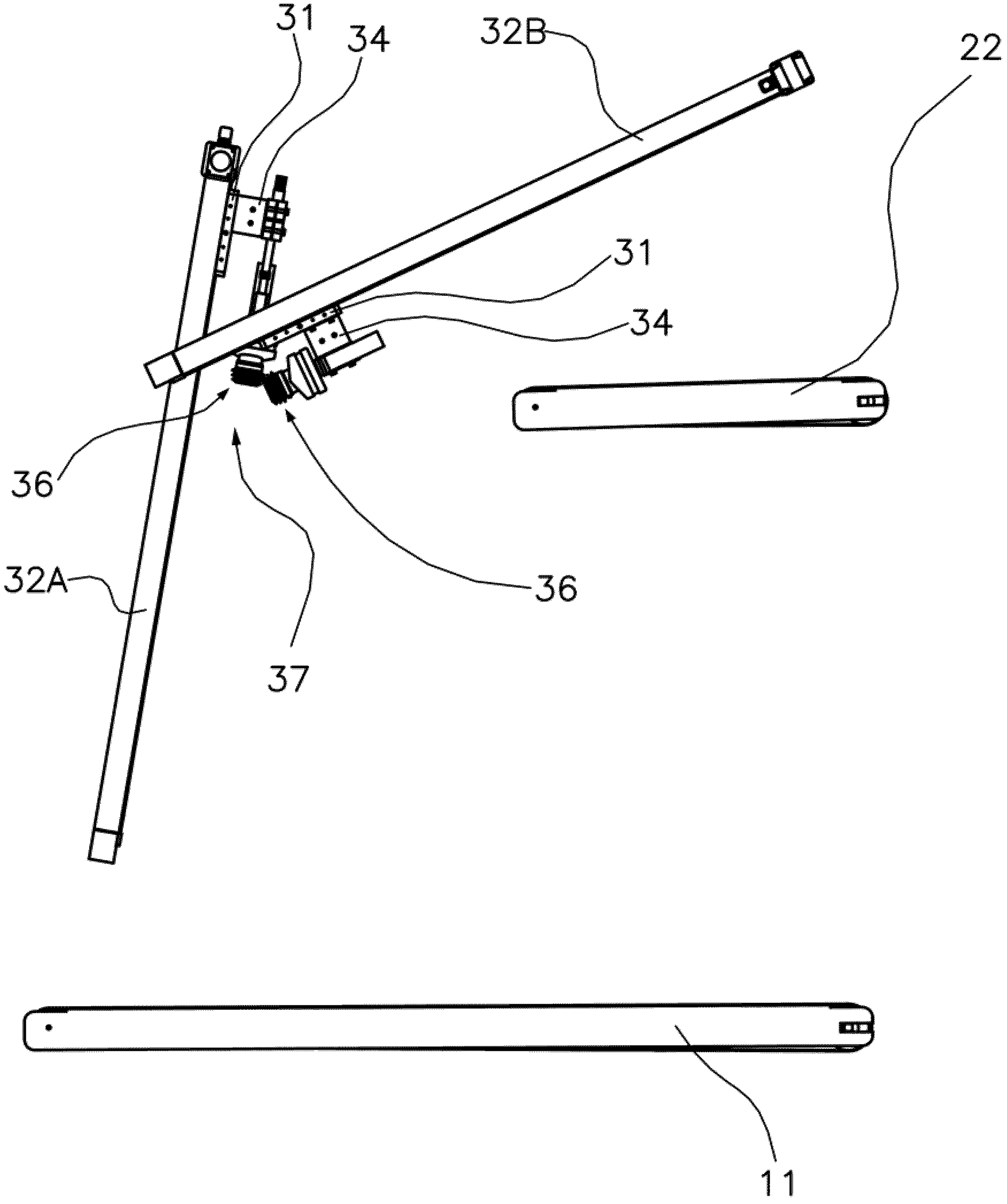
FIG. 4 shows a partial detailed view of the pick-up and transferring device of the second exemplary embodiment of a system for automatic textile items sorting according to the present invention.

FIG. 4 shows a partial detailed view of the pick-up and transferring device 3 of the second exemplary embodiment of the system for automatic textile items sorting of the present invention shown in FIG. 3. Each track portion 32A, 32B comprises a moving part 31 that moves along the corresponding track portion 32A, 32B and that acts as a support for the holder 34, provided with the suction means 36 and the gripper 30, that, in this figure, is hidden by the corresponding casing 361 and corresponding tubular section 362 (see FIGS. 5 and 6).

The gripper 30 (see FIGS. 5 and 6) of the first inclined track portion 32A is configured to grab a textile item accumulated on the reception station 1, and in particular, on the first conveyor belt 11, and transfer it to the transfer region 37. At the transfer region 37 the gripper 30 of the second inclined track portion 32B is configured to grab the textile item previously grabbed by the gripper 30 of the first inclined track portion 32A and transfer it to a position above the second conveyor belt 22. The grippers 30 are configured so that once the gripper 30 of the second track portion 32B has grabbed the textile item, the gripper 30 of the first track portion 32A releases or frees said textile item.

In the embodiment shown, the first track portion 32A and the second track portion 32B form an angle with respect to the horizontal and/or vertical. However, in other embodiments, the inclination first track portion 32A may be so that it is vertical and/or the inclination of the second track portion 32B may be so that it is horizontal.

Figure 5:
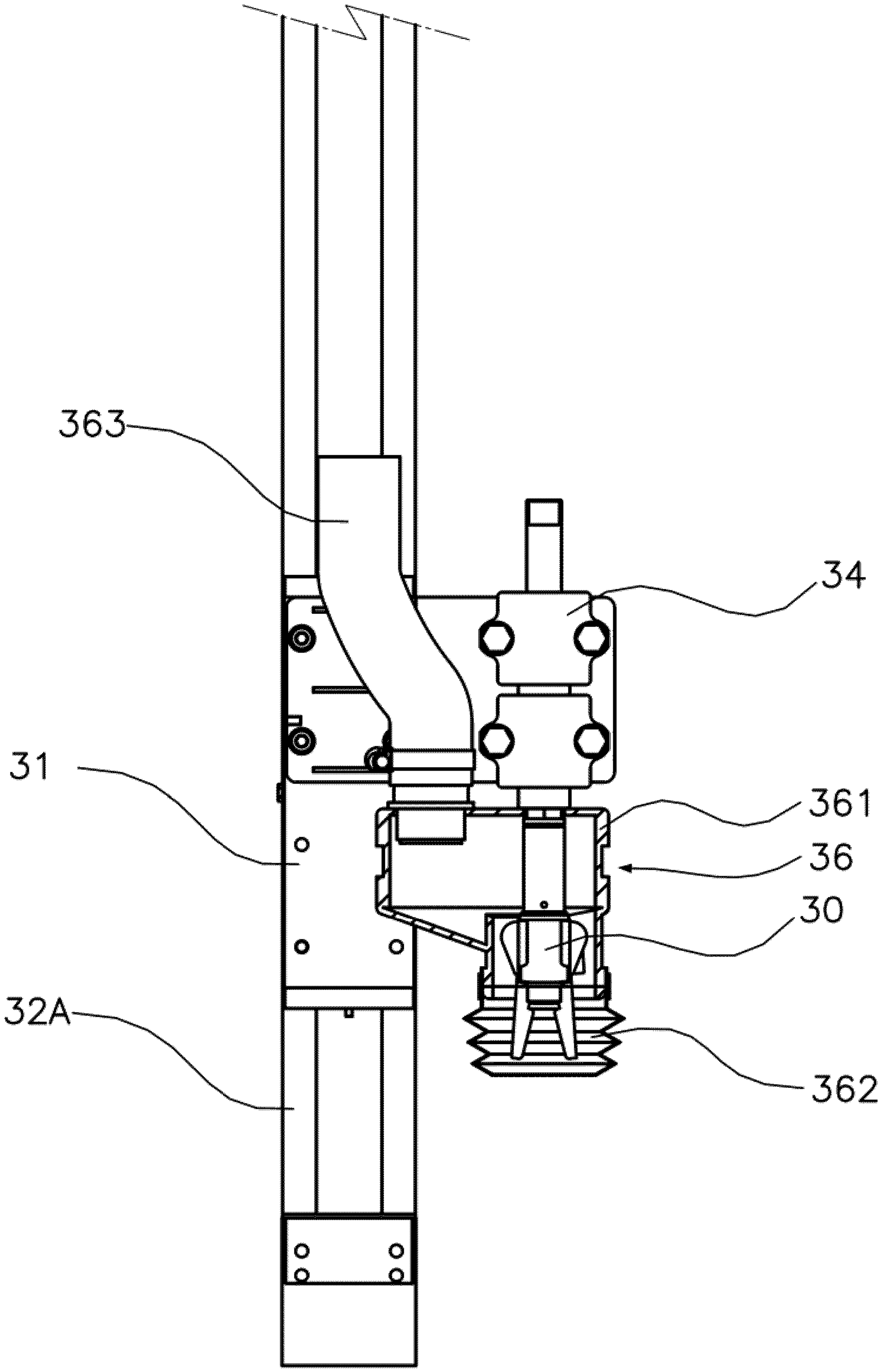
FIG. 5 shows a front view of a gripper and its suction means of the second exemplary embodiment of a system for automatic textile items sorting according to the present invention.
Figure 6:
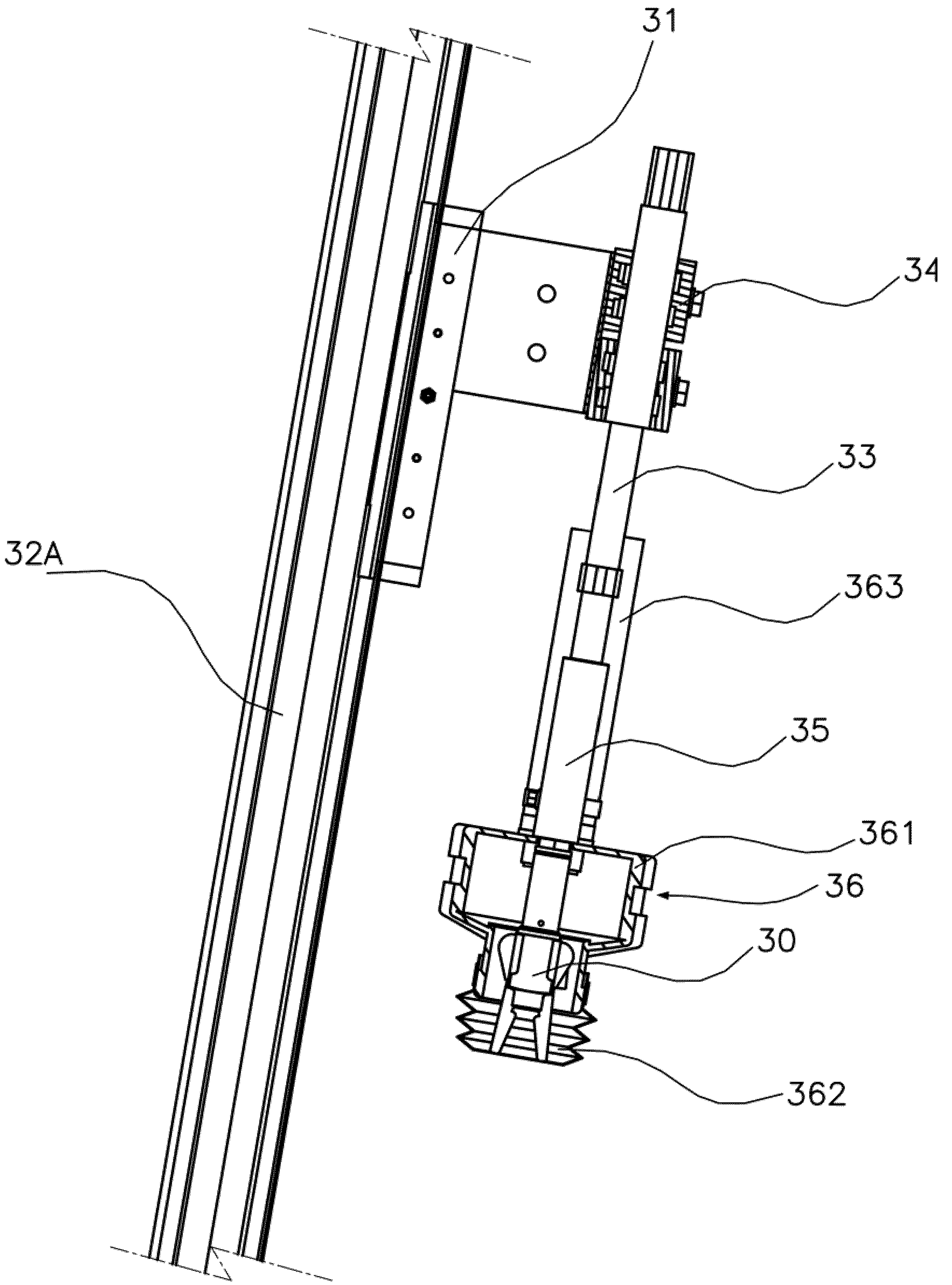
FIG. 6 shows a sectioned view of the gripper, and its suction means, shown in FIG. 5.

FIGS. 5 and 6 show detailed views of a gripper 30 and its corresponding suction means 36 of the pick-up and transferring device 3 of the second exemplary embodiment of the present invention. The suction means 36 aid the gripper 30 in holding the textile item that needs to be sorted by the system for automatic textile items sorting of the present invention. In particular, the suction means 36 suck a textile item and, subsequently, the gripper 30 grabs or hold said textile item.

The suction means 36 are preferably deactivated by a control device of the system for automatic textile items sorting once the gripper 30 effectively grabs a textile item. However, the suction means 36 can also be kept activated by said control device while the gripper 30 is grabbing a textile item. The control device of the system for automatic textile items sorting may also be configured to deactivate the suction means 36 of the corresponding gripper 30 of the first track portion 32A when it leaves the position above the first conveyor belt and to deactivate the suction means 36 of the corresponding gripper 30 of the second track portion 32B when it leaves the transfer region 37. In the latter case, the control device is preferably configured to activate the suction means 36 of the corresponding gripper 30 of the first track portion 32A when the gripper 30 arrives at a position above the first conveyor belt 11 and to activate the suction means 36 of the corresponding gripper 30 of the second track portion 32B when the gripper 30 arrives at the transfer region 37.

In the exemplary embodiment shown, the suction means 36 comprise a casing 361 at least partially enclosing a gripper 30, the casing 361 having an open end for the passage of the gripper 30 therethrough. As in the present case, the casing 361 may be tapered towards its open end. Said casing is preferably fluidly connected to a suction pump by a hose 363. Said hose 363 may be wholly flexible or may have a flexible portion and a rigid portion.

As in the embodiment shown, the casing 361 can comprise a flexible and expansible tubular section 362 around its open end. The combination of the tubular section 362 with the casing 361 greatly reduces the possibility of picking up more than one textile item with the gripper 30, as mentioned hereinabove.

Similarly, to the first exemplary embodiment shown in FIGS. 1 and 2, in the second exemplary embodiment the holder 34 is connected to the moving part 31 that slides along the track portion 32A, 32B and to the gripper 30 by means of a portion 33 connected by its lower part to an extender 35 that is further connected to the gripper. To cushion the impact of the gripper 30 on textile items, the portion 33 may be elastic with regard to a direction of movement of the gripper 30 towards the textile item to be grabbed. The extender 35 separates the gripper 30 from the track portion 32A, 32B allowing enough space to grab the textile items.

The present invention also discloses alternative setups of the system for automatic textile items sorting.

In one embodiment, the system for textile items sorting comprises one reception station 1 for accumulated textile items and two textile items recognition stations 2 including a textile items identifying and recognizing device 20 in each station 2. Several pick-up and transferring devices 3 are associated to the reception station 1, including grippers 30 configured to grab individual pieces of textile items accumulated on the reception station 1, and moving members 31 configured to convey the grippers 30 from the reception station 1 to the two textile items recognition stations 2. From these two textile items recognition stations 2, conveyors convey the textile items having been recognized by the textile items identifying and recognizing device 20 towards a single sorting and separating station 4 for textile items.

In another embodiment, the system for textile items sorting comprises two reception stations 1 for accumulated textile items arranged in parallel, each of them feeding a corresponding textile items recognition station 2 including a textile items identifying and recognizing device in each station 2 by means of a corresponding pick-up and transferring device 3 including grippers 30 configured to grab individual pieces of textile items accumulated on each of the reception stations 1, and moving members 31 configured to convey the grippers 30 from each reception station 1 to a corresponding textile items recognition station 2. A single sorting and separating station 4 for textile items receives the identified textile items.

Still in a further embodiment, the system for textile items sorting comprises two reception stations 1 for accumulated textile items arranged in parallel each of them feeding a single textile items recognition station 2 properly sized including a textile items identifying and recognizing device 20, from which the textile items are conveyed towards a single sorting and separating station 4 for textile items or returned to the reception stations 1.

Still in a further embodiment, the grippers 30 of the pick-up and transferring device 3 shown in FIG. 1; i.e., wherein the inclined tracks 32 are parallel to each other and their respective grippers 30 are synchronized so that when one gripper 30 grabs the pieces of textile items on the reception station 1, the other gripper 30 is in a stage of transference of the pieces of textile items to the textile items recognition station 2; may comprise suction means 36 as described hereinabove.

Still in a further embodiment, the grippers 30 of the pick-up and transferring device shown in FIGS. 3 to 6; i.e., wherein a first and a second inclined track portions 32A, 32B that intersect each other defining a transfer region 37, a first inclined track portion 32A extending from the position above the first conveyor belt 11 to the transfer region 37 and a second track portion 32B extending from the transfer region 37 to the position above the second conveyor belt 22; may lack of suction means 36, so that the gripper 30 is similar to the one shown in FIG. 2.

Further alternative setups are also possible within the scope of the present invention.

It will be understood that various parts of one embodiment of the invention can be freely combined with parts described in other embodiments, even being said combination not explicitly described, provided that such combination is within the scope of the claims and that there is no harm in such combination.

The invention claimed is:

1. System for automatic textile items sorting, that comprises:

a reception station for textile items that accumulate within it;

a textile items recognition station including a textile items identifying and recognizing device;

a pick-up and transferring device including grippers configured to grab individual pieces of textile items accumulated on the reception station, and transferring them from the reception station to the textile items recognition station;

a sorting and separating station for textile items having been recognized by the textile items identifying and recognizing device, wherein the reception station includes a deposit having a first conveyor belt arranged at a bottom area of the deposit;

the textile items recognition station includes a second and a third conveyor belts at different heights;

the pick-up and transferring device comprises at least a pair of inclined tracks extending from a position above the first conveyor belt to a position above the second conveyor belt, each track including an independently actuated gripper associated to a moving member; and the third conveyor belt includes a feeding end connected to the sorting and separating station and a returning end extending over the first conveyor for returning textile items to the reception station.

2. The system for automatic textile items sorting according to claim 1, wherein the pick-up and transferring device comprises suction means fluidly connected to a suction pump, the suction means comprising a casing at least partially enclosing a gripper, the casing having an open end for the passage of the gripper therethrough.

3. The system for automatic textile items sorting according to claim 2, wherein the suction pump is at least one of a positive displacement pump, a momentum transfer pump, a regenerative pump, an entrapment pump or a venturi pump.

4. The system for automatic textile items sorting according to claim 2, wherein the casing comprises a flexible and expansible tubular section around its open end.

5. The system for automatic textile items sorting according to claim 1, wherein the second conveyor belt is arranged at a superior height relative to the third conveyor belt.

6. The system for automatic textile items sorting according to claim 1, wherein the inclined tracks are parallel to each other and their respective grippers are synchronized so that when one gripper grabs the pieces of textile items on the reception station, the other gripper is in a stage of transference of the pieces of textile items to the textile items recognition station.

7. The system for automatic textile items sorting according to claim 1, wherein each inclined track comprises at least a first and a second inclined track portions that intersect each other defining a transfer region, a first inclined track portion extending from the position above the first conveyor belt to the transfer region and a second track portion extending from the transfer region to the position above the second conveyor belt.

8. The system for automatic textile items sorting according to claim 2, further comprising a control device configured to activate or deactivate the suction means of the gripper.

9. The system for automatic textile items sorting according to claim 1, wherein each gripper is connected to the moving member by an elastic portion.

10. The system for automatic textile items sorting according to claim 1, further comprising a feeding station that is connected to the reception station comprising a fourth conveyor belt with a feeding section arranged at a superior height relative to the first conveyor belt.

11. The system for automatic textile items sorting according to claim 10, wherein the fourth conveyor belt is arranged substantially perpendicular to the first conveyor belt.

12. The system for automatic textile items sorting according to claim 1, wherein the textile items identifying and recognizing device is associated to the third conveyor belt.

13. The system for automatic textile items sorting according to claim 1, wherein the textile items identifying and recognizing device includes a recognizing and identification system based on radiofrequency identification (RFID), X ray, and/or cameras.

14. The system for automatic textile items sorting according to claim 1, wherein the second and third conveyor belts are partially overlapped.

15. The system for automatic textile items sorting according to claim 1, wherein the sorting and separating station includes several successive stepped conveyor belts each having a first end over a deposit for receiving a given kind of textile items and a second end of each conveyor belt is arranged over a successive conveyor belt.

16. A method for automatic sorting of textile items comprising the following steps:

accumulating textile items within a reception station;

picking up textile items from the reception station and transferring them to a textile items recognition station;

identifying the textile items in the textile items recognition station; and conveying identified textile items to a sorting and separating station for textile items including several deposits for receiving different kinds of sorted textile items, wherein the step of identification of the textile items in the textile items recognition station comprises:

receiving the transferred textile items on a second conveyor belt arranged at a first height;

transferring the received textile items to a third conveyor belt located at a lower height with respect to the second conveyor belt;

identifying the textile items when arranged on said third conveyor; and actuating the third conveyor into a feed direction towards the sorting and separating station or in a returning direction towards the reception station, depending on the result of the identification.

17. The method according to claim 16, wherein the step of accumulation of textile items in the reception station comprises receiving the textile items on a first conveyor belt in the reception station; and conveying by means of the first conveyor belt the textile items to a certain pick-up location of the reception station.

18. The method according to claim 16, wherein the step of picking up textile items from the reception station and transferring them to a textile items recognition station comprises:

grabbing a textile item from the reception station with a gripper arranged in a first inclined track portion extending from a position above the first conveyor belt to a second inclined track intersecting said first inclined track and extending to a position above the second conveyor belt, transfer the textile item from the first inclined track portion to the intersection between the first and the second inclined track portions by releasing a gripper from the first inclined track and grabbing the textile item with a gripper arranged in the second inclined track portion, and transfer the textile item from the intersection between the first and second inclined track portions to the second conveyor belt.

19. The method according to claim 18, wherein the step of grabbing a textile item from the reception station with a gripper comprises:

sucking a textile item from the reception station with suctions means, and grabbing the textile item with a gripper adjacent the suction means.

* * * * *